United States Patent [19]

Araki

[11] 4,373,791
[45] Feb. 15, 1983

[54] FOCUSING POSITION DETECTION APPARATUS

[75] Inventor: Kunihiko Araki, Tokyo, Japan

[73] Assignee: Ricoh Company, Ltd., Tokyo, Japan

[21] Appl. No.: 122,999

[22] Filed: Feb. 20, 1980

[30] Foreign Application Priority Data

Feb. 20, 1979 [JP] Japan .................................. 54-18919
Feb. 28, 1979 [JP] Japan .................................. 54-22688

[51] Int. Cl.$^3$ .......................... G03B 7/099; G01J 1/20
[52] U.S. Cl. ........................... 354/25; 250/201; 352/140
[58] Field of Search ............... 354/25, 31, 195; 250/201, 204; 352/140; 350/46, 47; 355/55, 56; 353/76

[56] References Cited

U.S. PATENT DOCUMENTS 4,047,022 9/1977 Holle .................................. 354/25
4,097,730 6/1978 Korpel ............................... 250/201
4,185,191 1/1980 Stauffer ............................. 250/204

OTHER PUBLICATIONS

Keppler's Slr Notebook, Modern Photography Apr. 1980, pp. 95–97.

*Primary Examiner*—Stafford D. Schreyer
*Attorney, Agent, or Firm*—Wyatt, Gerber, Shoup, Scobey & Badie

[57] ABSTRACT

In a pupil divisional type focusing position detection apparatus of the type capable of detecting the infocus state of a taking lens based on a phase difference of output signals produced from at least one photosensor array for receiving rays of image formation light from the exit pupil of the taking lens, the focusing position detection accuracy can be changed as desired or in accordance with F-number of the taking lens.

10 Claims, 31 Drawing Figures

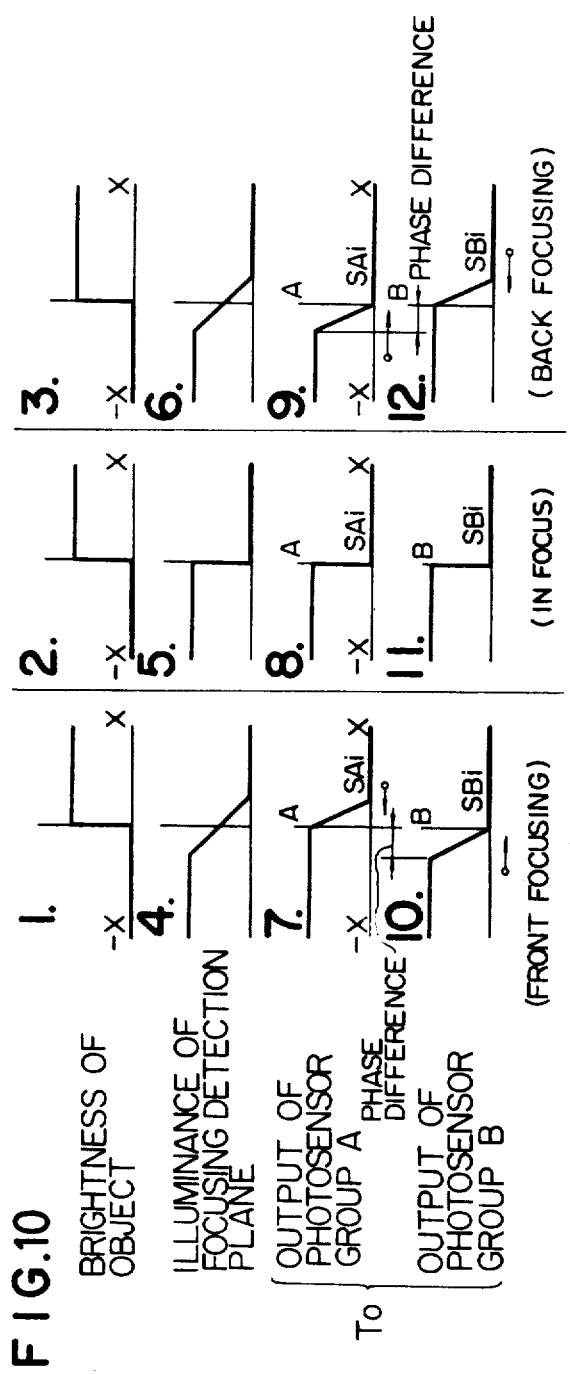

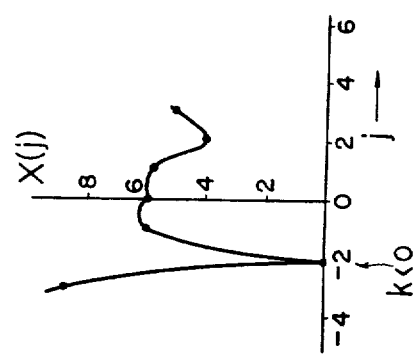
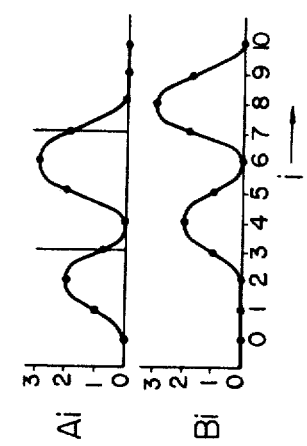
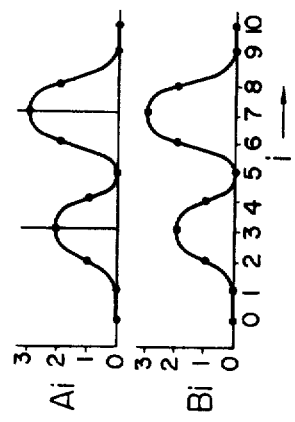
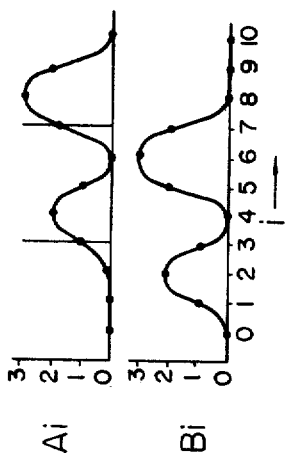
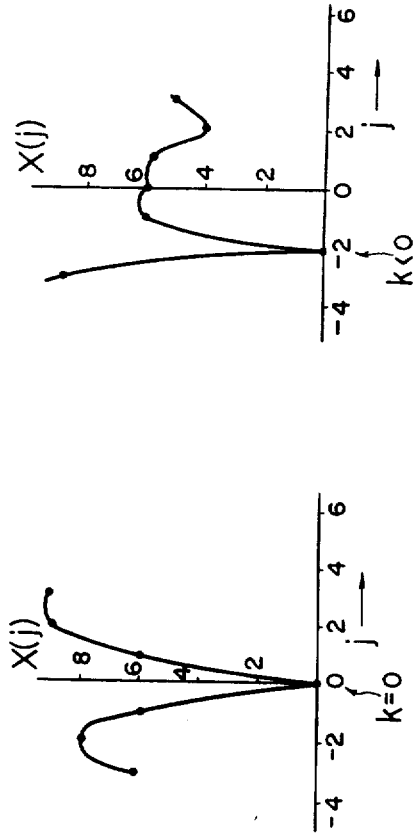
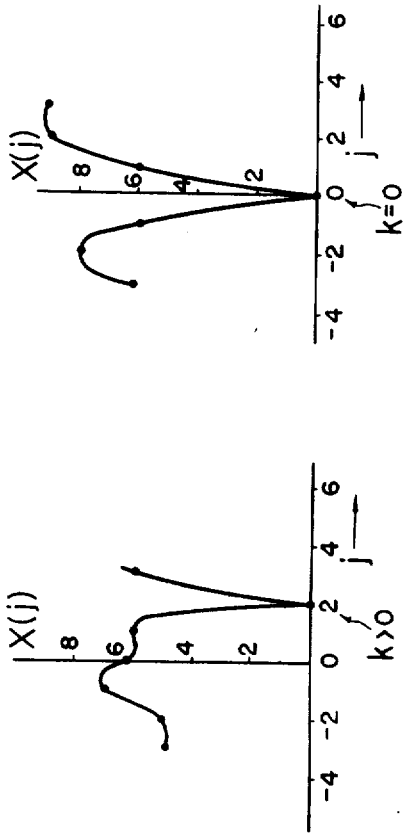

IN-FOCUS RANGE

FOCUSING POSITION DETECTION APPARATUS

BACKGROUND OF THE INVENTION

The present invention relates to a pupil divisional type focusing position detection apparatus.

Conventionally, there is known a focusing position detection apparatus utilizing a photoelectric element whose resistance becomes maximum when the image of an object is focused on the photoelectric element. In another conventional focusing position detection apparatus, double images of the object are respectively projected onto different photoelectric elements and the difference between the electric currents which flow through the respective photoelectric elements is measured and when the image of the object is focused, the difference of the photoelectric currents becomes minimum.

In these focusing position detection apparatuses, the focusing position itself can be determined. However, when the object is out of focus, it cannot be determined whether the focused position is in front of the film surface (hereafter referred to as a front focusing state) or the focused position is behind the film surface (referred to as a rear focusing state). Therefore, in these apparatuses, it is required that a prescanning be initiated from a predetermined direction, for example, from close range to infinite range so that the focusing position is searched and detected and then the photographing lens is moved to the detected focusing position. This prescanning step, however, is laborious.

A focusing position detection apparatus which does not require the prescanning can be proposed. The principle of the focusing position detection apparatus will now be explained by referring to FIG. 1 through FIG. 6.

In the focusing position detection apparatus, as shown in FIG. 1, rays of light are caused to enter a pair of self-scanning type photoelectric element arrays 3, such as CCD (Charge Coupled Device) type image sensors and MOS type image sensors, from a peripheral portion of an exit pupil of a photographing lens 1 through a group of small lenses 2 such as lenticular lenses and fly-eye lenses so that the focusing position is detected from the difference of the phases of the output signals of the photoelectric element arrays 3. This type of the focusing position detection apparatus is referred to as a pupil divisional type focusing position detection apparatus since rays of light coming from two divided portions of a photographing lens are utilized in detecting the focusing position. The focusing position is detected as follows: When the image of an object is in focus as shown in FIG. 1, the divisional rays of light correctly enter a pair of photoelectric elements 3a-1 and 3a-2 from the photographic lens 1. Therefore, the phases of the outputs of the respective photoelectric elements 3a-1, 3a-2 are in agreement with each other. When the image is focused in front of the focusing plane, that is, in the so-called front focusing state, the divisional rays of light from the photographing lens 1 respectively enter another pair of photoelectric elements 3b-1, 3c-2, so that the phases of the output signals of the pair of the photoelectric elements 3b-1, 3c-2 are shifted from each other as shown in FIG. 4. On the other hand, in the case of a rear focusing state as shown in FIG. 5, a divisional ray of light $l_1$ enters a photoelectric element 3c-2, which is indicated by a white block, although, in the focusing state, the divisional ray of light $l_1$ should enter the photoelectric element 3a-1, which is indicated by a solid black block in FIG. 5. Furthermore, in the back focusing state, another divisional ray of light $l_2$ enters the photoelectric element 3b-1, which is indicated by a black block. As a result, the phases of the output signals of the photoelectric elements 3c-1, 3b-2 are reversed as shown in FIG. 6 in contrast with the case in FIG. 4. Thus, by detecting the difference of the phases of the output signals of the photoelectric elements, it can be determined whether the image of an object is in focus or in the front or rear focusing state.

In the case of this sort of the focusing position detection apparatus, the detection accuracy of focusing position is usually set at its maximum accuracy and therefore the focusing position is deviated by a slight movement of either the taking lens or an object. In particular, when the accuracy of detecting focusing position is high, great care has to be taken when the taking lens is moved manually to determine the in-focus position correctly in accordance with the detected result, while watching the focus indication within a viewfinder of a camera. In a camera of the type in which the taking len is automatically moved by a motor in accordance with the detected result, it is required that the motor be always rotated. This needs laborious steps.

Furthermore, since the shooting aperture is usually reduced when taking pictures, F-number of the taking lens is usually set so as to correspond to the reduced shooting aperture. Therefore, if the detection accuracy is fixed, the focusing is performed at a higher accuracy than it needs.

Furthermore, in the pupil divisional type focusing position detection apparatus, pairs of photosensors are usually disposed as shown in FIGS. 7 and 8 and a pupil divisional angle $\theta_F$ is fixed. Since the pupil divisional angle $\theta_F$ corresponds to the F-number of the taking lens in the relationship of $F_{NO} = (1/2 \sin \theta_F)$ when the taking lens is set at an indefinite focusing $\infty$ if the pupil divisional angle $\theta_F$ is constant, the F-number is also constant. It follows that no taking lens having a different F-number can be used in the pupil divisional type focusing position detection apparatus as shown in FIGS. 7 and 8. However, interchangeable lenses having different F-numbers are frequently used in practice in cameras and F-number is relatively changed in accordance with the change of the shooting aperture by adjusting the diaphragm. Therefore, when a mounted taking lens is replaced with a taking lens having the same focal length as that of the previous taking lens and having a larger aperture relative to a predetermined F-number, ordinarily the pupil divisional angle $\theta_F$ is increased and accordingly the detection accuracy is also increased. However, since the pupil divisional angle $\theta_F$ is constant, the detection accuracy is not increased in this case. Furthermore, when a taking lens having a smaller aperture relative to the predetermined F-number is mounted or when the shooting aperture of the taking lens is reduced, divided rays of light for measuring the distance of objects are not received correctly by the corresponding photosensors, so that it becomes impossible to detect the focusing position accurately. When closeups are taken by moving the taking lens forwards, F-number is relatively increased so that detection of the focusing position becomes impossible again.

SUMMARY OF THE INVENTION

It is an object of the invention to provide an improved pupil divisional type focusing position detection apparatus capable of eliminating the shortcomings of the ordinary pupil divisional type focusing position detection apparatus.

Another object of the invention is to provide a pupil divisional type focusing position detection apparatus capable of detecting a correct in-focus position in accordance with F-number of a selected taking lens or F-number determined by each photographing condition.

According to the invention, in the pupil divisional type focusing position detection apparatus which is capable of detecting the in-focus state of a taking lens based on a phase difference of output signals produced from at least one photosensor array for receiving rays of image formation light from the exit pupil of the taking lens, the focusing position detection accuracy can be changed as desired or in accordance with the F-number of the taking lens.

BRIEF DESCRIPTION OF THE DRAWINGS

In the drawings:

FIGS. 10, 11A, 11B and 11C show the differences of the output of signals depending upon the in-focus, front focusing and rear focusing state in the pupil divisional type focusing position detection apparatus of FIGS. 9A and 9B.

FIGS. 16A, 16B and 16C show the outputs in the operations in FIG. 15.

DESCRIPTION OF THE PREFERRED EMBODIMENTS

Figure 9A:
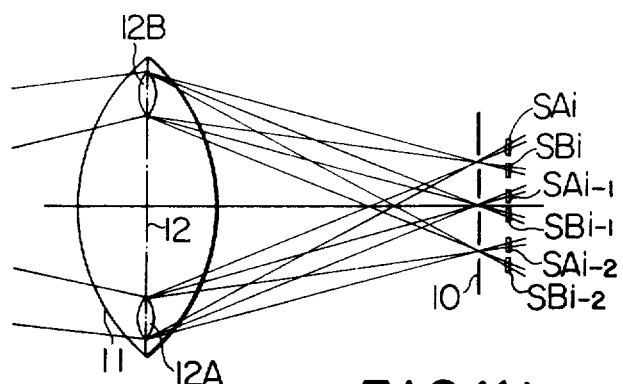
FIGS. 9A and 9B show more specifically part of the pupil divisional type focusing position detection apparatus of FIG. 1.
Figure 9B:
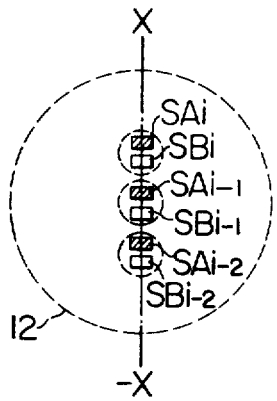

Referring now to FIGS. 9A and 9B, there is shown part of a pupil divisional type auto focusing position position detection apparatus. In FIGS. 9A and 9B, the rays of image formation light, which pass through part of exit pupil divisional portions 12A, 12B of exit pupil 12 of a taking lens 11, are respectively caused to enter photosensors $SA_o, \ldots SA_i \ldots SA_n$ of group A and photosensors $SB_o, \ldots SB_i \ldots SB_n$ of group B through a pupil division type optical system 10, such as pin holes, slits, lenticular lenses or fly-eye lenses. The photosensors $SA_o$ and $SB_o, \ldots SA_i$ and $SB_i, \ldots SA_n$ and $SB_n$ are respectively paired, and out of the rays of light which enter each identical position of a focusing detection plane, the rays of image formation light which pass the exit pupil divisions 12A, 12B enter each of the above-mentioned pairs of photosensors as shown in FIG. 9A.

Referring to FIG. 10, the uppermost three graphs 1, 2 and 3 show the brightness of an object whose first half is dark and whose second half is light. The brightness of the object is inverted by the taking lens 11 and when the taking lens 11 is in focus, the illuminance of the image of the object on the focusing detection plane is clear-cut as shown in graph 5. However, when the taking lens 11 is defocused, although the dark and light portions are likewise inverted by the taking lens 11, the boundary between them is not clearly defined as shown in graphs 4 and 6, and there occurs some difference between the phase of the output of photosensor group A and that of photosensor group B as shown in graphs 7 and 10, and 9 and 12, and furthermore, the shifting directions of the two phases are respectively opposite in the front and rear focusing states. When focusing is performed, starting from the front or rear focusing state, the respective shifting directions of the output phases of the photosensor groups A and B are opposite to each other and are shown by the arrow O————→ in graphs 7 and 10, and 9 and 12.

Figure 11A:
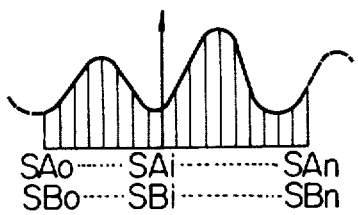
Figure 11B:
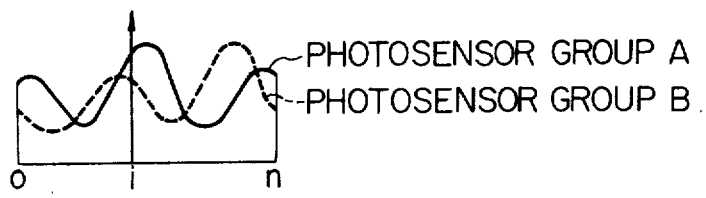
Figure 11C:
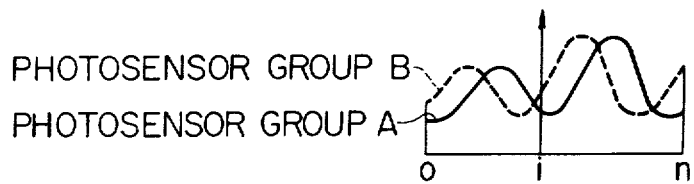

FIGS. 11A, 11B and 11C respectively show the illuminances of the image of an object on the focusing detection plane. More particularly, FIG. 11A shows the illuminance of the image of the object in focus, FIG.

11B shows it in a front focusing state, and FIG. 11C shows it in a rear focusing state.

Figures 12A, 12B:
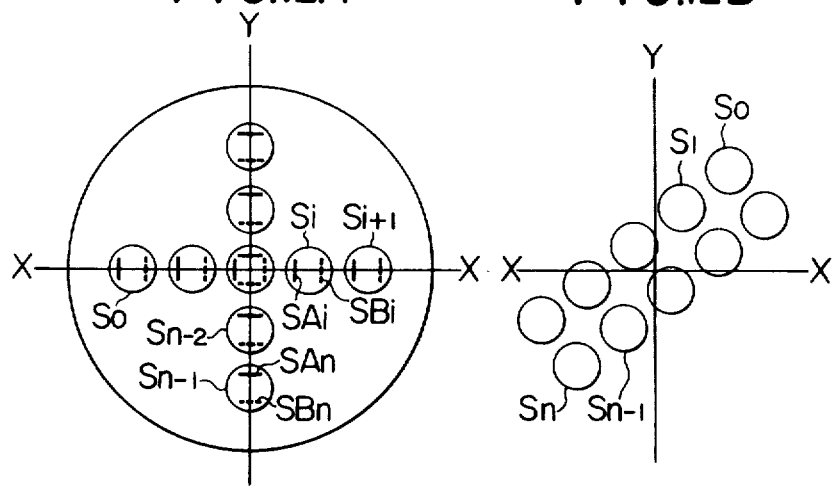
FIG. 12A shows an arrangement of photosensors in the pupil divisional type focusing position detection apparatus of FIGS. 9A and 9B.
FIG. 12B shows another arrangement of photosensors in the pupil divisional type focusing position detection apparatus of FIGS. 9A and 9B.

The photosensors can be arranged by disposing photoelectric elements $S_o, \ldots S_{n-1}$, each of which has a pair or two pairs of photosensors $SA_o, SB_o, \ldots SA_n, SB_n$ in the directions X and Y as shown in FIG. 12A, or the photoelectric elements $S_o, \ldots S_n$ each of which has a pair of photosensors $SA_o, SB_o \ldots SA_n, SB_n$, can be arranged in two rows in an orientation of 45° with respect to X or Y as shown in FIG. 12B.

Figure 13:
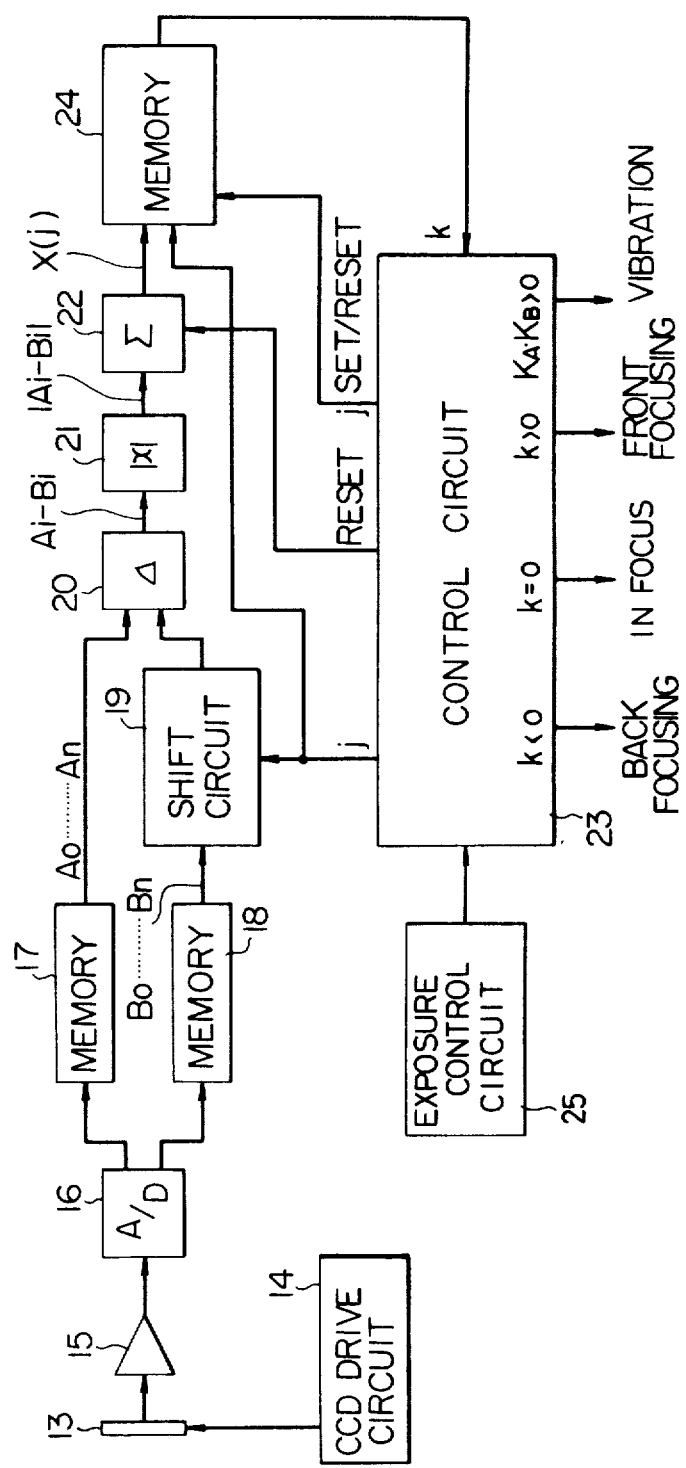
FIG. 13 is a block diagram of the electric circuits in the focusing position detection apparatus of FIGS. 9A and 9B.

The photosensors $SA_o \ldots SA_n$ and the photosensors $SB_o \ldots SB_n$ comprise one set of Charge Coupled Devices (CCD) 13 and the processing of their output data is performed by a system as shown in FIG. 13. In this system, the CCD 13 is driven by a CCD driving circuit 14 so that the output signals of the CCD 13 are converted to digital signals through a video amplifier 15 and an A/D converter 16, and the converted digital signals are stored in memories 17, 18. In this case, output signals $A_o \ldots A_n$ of the photosensors $SA_o \ldots SB_n$ of group A are stored in the memory 17 and, at the same time, output signals $B_o \ldots B_n$ of the photosensors $SB_o \ldots SB_n$ of group B are stored in the memory 18. The output signals of the memory 18 are shifted by a shift circuit 19 and the differences between the output signals and the signals of the memory 17 are determined by a differential circuit 20. The output signals of the differential circuit 20 are converted to their absolute values by an absolute value conversion circuit 21 and their summation is obtained by an integration circuit 22. A control circuit 23 changes a shift value j of the shift circuit 19 and, at the same time, resets the integration circuit 22 and repeats the above-mentioned operation. Thus, by use of a memory 24, k is obtained, which is the value of j when X is minimum, whereby it is detected whether the taking lens is experiencing a change in the focusing state (namely the front focusing, in focus, or rear focusing) or being subjected to vibrations.

Figure 15:
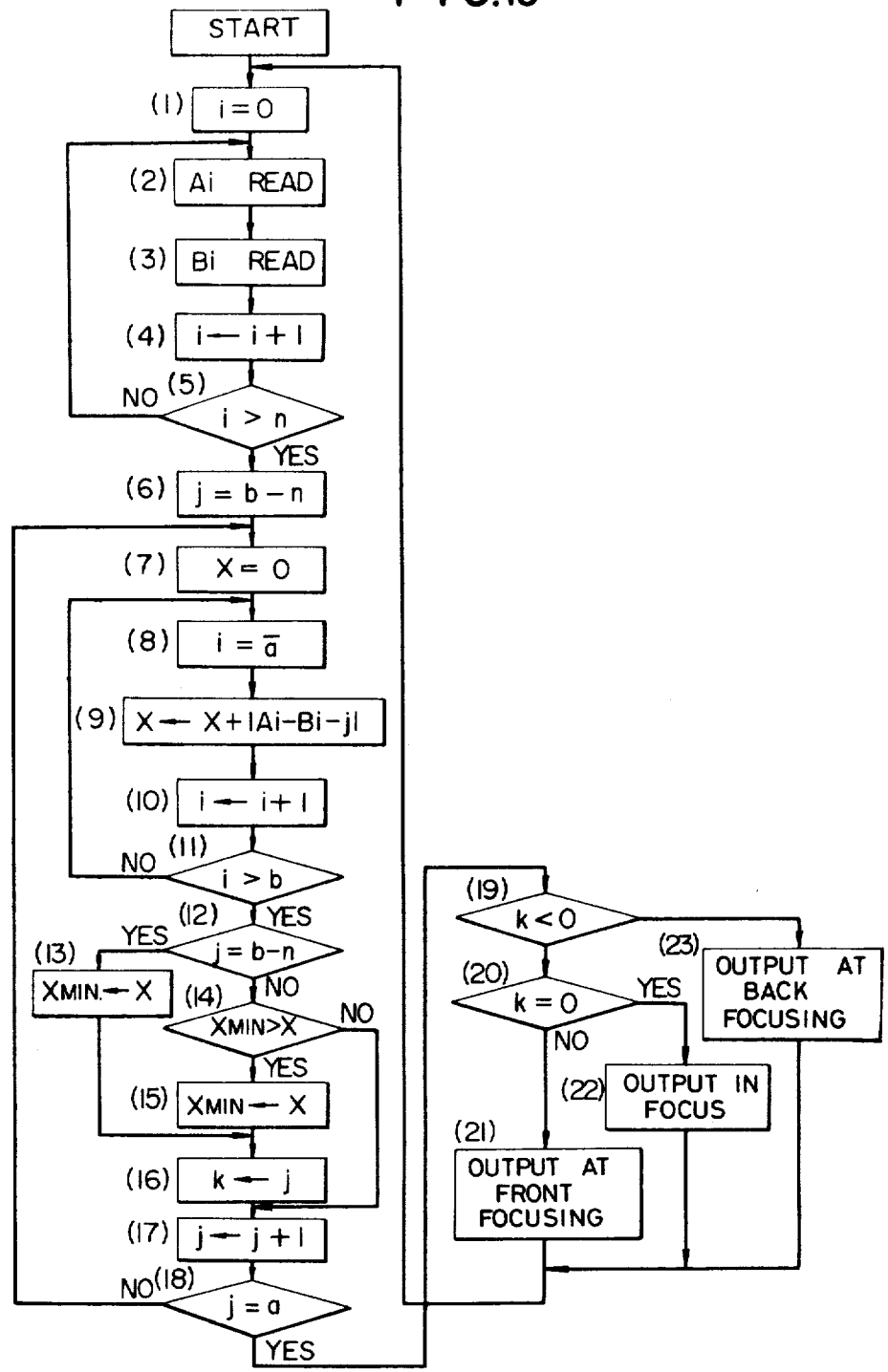
FIG. 15 is a flow chart for the operations in the electric circuits of FIG. 13.

In order to detect the focusing state of the taking lens, the data $A_o \ldots A_n$ and $B_o \ldots B_n$ are read from the CCD 13 (FIG. 13) and stored in the memories 17, 18, taking steps 1 through 5 as shown in the flow chart of FIG. 15.

The following operation is performed in steps 6 to 11 in FIG. 15.

$$X = \sum_{i=a}^{b} |A_i - B_{i-j}| \quad \text{Equation (1)}$$

wherein $o < a < b < n$ $a \leq i \leq b$ $b - n \leq j \leq a$

The result X of this operation is a function of the shift value j, that is, the function X(j), which is shown in FIGS. 16A to 16C. Hence, the relationship between the value k of the shift value j when X(j) becomes minimum and the focusing state of the taking lens is as follows:

$$\left. \begin{array}{ll} \text{Front focusing} & k > o \\ \text{In focus} & k = o \\ \text{Rear focusing} & k < o \end{array} \right\} \quad \text{Equation (2)}$$

Figure 14:
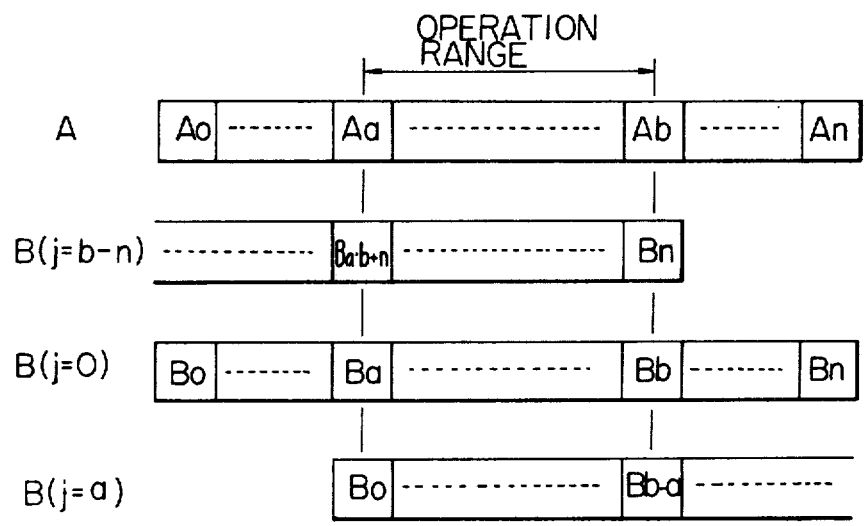
FIG. 14 shows the operational ranges in the electric circuits of FIG. 13.

In steps 12 to 18, initially (when $j = b - n$), X is regarded to be minimum $X_{MIN}$ and the minimum value $X_{MIN}$ is stored in the memory 24 and at the sime time, j is stored in the memory 24, supposing that $j = b - n$ is k. After increment of the shift value j, the operation is returned to the step 7. From the second operation on (when $j = b - n$), when the operation result X is smaller than the minimum value $X_{MIN}$ of the memory 24, $X_{MIN}$ and k in the memory 24 are respectively changed to X and j and the operation is returned to the step 7 after increment of the j, and when $X_{MIN} > X$, the operation is directly returned to the step 7. FIG. 14 shows the relationship between the data $A_o-A_n$ and $B_o-B_n$ in the memories 17, 18 and the shift value j and the range for the operation in accordance with the previously mentioned equation 1. When j becomes equal to a (j=a), the operation is advanced to steps 19 to 23, so that the control circuit 23 detects the focusing state of the taking lens (namely, the front focusing, in focus or rear focusing), in accordance with the discrimination of the equation 2 based on the value k in the memory 24. In accordance with the output of the control circuit 23, the taking lens is driven by a lens driving motor to perform the focusing operation or the focusing state is indicated by an indication apparatus so that the focusing operation may be performed manually. The taking lens 11 can constitute a photographing lens or can be a lens distinct from a photographing lens which is associated with the taking lens 11.

Figure 17:
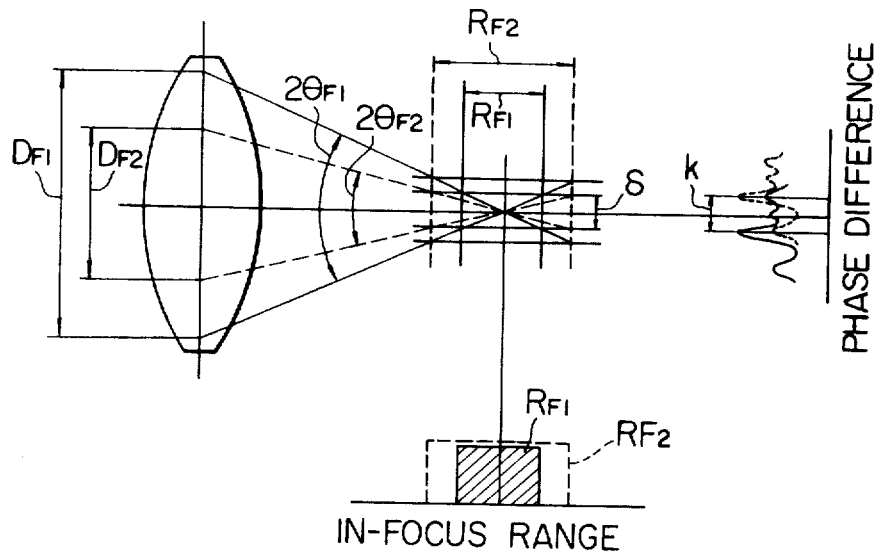
FIG. 17 is a schematic diagram for explaining the principle of the invention.
Figure 18:
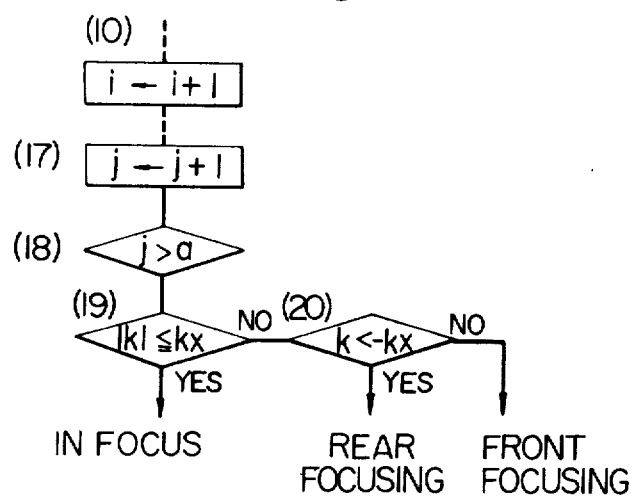
FIG. 18 shows part of a flow chart for the operational processing in one embodiment according to the invention.

Referring to FIG. 17, the accuracy of detecting focusing position will be explained. When the diameter of a pupil is $D_{F1}$ and the permissible diffusion is $\delta$, the depth of focus is $R_{F1}$. When the diameter of a pupil is $D_{F2}$ which is smaller than $D_{F1}$ and the permissible diffusion is the same, the depth of focus is $R_{F2}$. Therefore, the smaller the diameter of pupil (namely the greater the F-number), the greater the depth of focus and the broader the in-focus range and accordingly it becomes unnecessary to make the accuracy of detecting focusing position so high. Furthermore, even if there is a phase difference k in the outputs of the photosensors, which is in the range of the permissible diffusion $\delta$, the phase difference k can be tolerated. In case the diffusion becomes greater than the permissible diffusion $\delta$, it indicates the taking lens is in a front or rear focusing state and the phase difference k is further shifted in either the front or rear focusing direction. Therefore, by determining a permissible shift kX corresponding to the in-focus range $R_F$ at each F-number, where $kX \geq 0$, and then comparing the permissible shift kX with the phase difference k, the in-focus position can be detected with an accuracy corresponding to each F-number. This operation is performed in accordance with the flow chart shown in FIG. 18. More specifically, in FIG. 15, with respect to the output k from step 18, |k| and Kx are compared with each other in step 19 and if the absolute value of the phase difference k is equal to or smaller than the permissible shift Kx, a signal indicating in-focus state is produced since the phase difference k is in the in-focus range. If not and when the phase difference k is smaller than a negative permissible shift $-Kx$ in step 20, a signal indicating rear focusing state is produced and, when $k > -Kx$, a signal indicating front focusing state is produced. This corresponds to the previous description of $k < 0$ in the case of rear focusing state and $k > 0$ in the case of the front focusing state. The permissible shift Kx is input in such a manner as to correspond to a signal of the F-number of the taking lens at the time of photographing, which is output from an exposure control circuit 25 connected to the control circuit 23 in FIG. 13.

Figure 19:
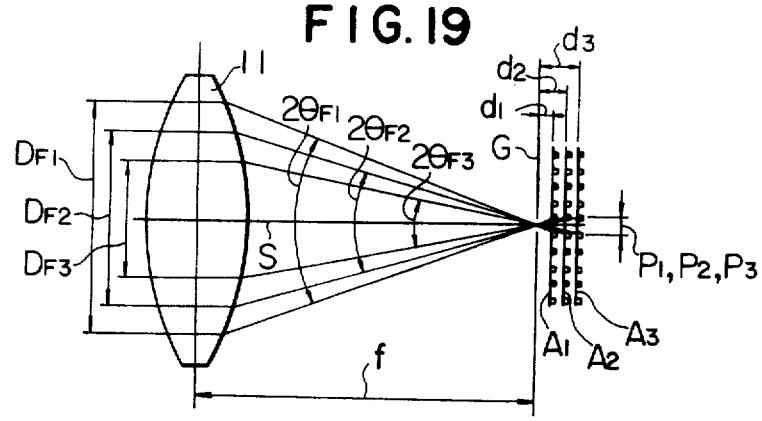
FIG. 19 shows schematically another embodiment of a pupil divisional type focusing position detection apparatus according to the invention.
Figure 20:
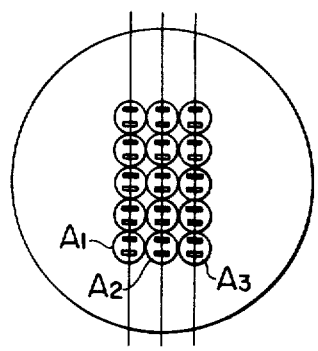
FIG. 20 is a schematic side view of the focusing position detection apparatus of FIG. 19.
Figure 21:
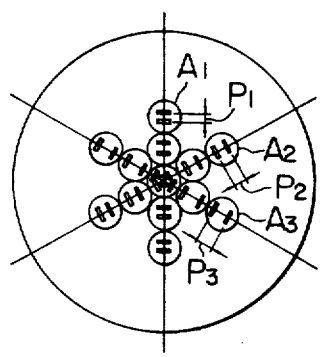
FIG. 21 shows schematically a further embodiment of a pupil divisional type focusing position detection apparatus of the invention.

In the aforementioned case, the pupil divisional angle $\theta_F$ is fixed and as shown in FIG. 17, the respective pupil divisional angles $\theta_{F1}$ and $\theta_{F2}$ differ corresponding to the respective diameters of pupils $D_{F1}$ and $D_{F2}$ and accordingly their respective in-focus ranges $R_{F1}$ and $R_{F2}$ also differ. Therefore, if the photosensors are disposed in the different positions, the focusing position can be detected with a detection accuracy corresponding to each F-number which is different, depending upon the respective pupil divisional angles. In FIG. 19, a first photosensor array $A_1$, a second photosensor array $A_2$ and a third photosensor array $A_3$ are disposed at distances $d_1$, $d_2$ and and $d_3$, respectively, from a focal surface G of the taking lens 11 in such a manner as to be normal to the optical axis S of the taking lens 11 and also to be vertically and adjacently parallel to each other and not be overlapped at the optical axis S as shown in FIG. 20. Each of the photosensor arrays $A_1$, $A_2$ and $A_3$ comprises a row of pairs of photosensors and the pitch P between the photosensors is constant. The photosensor arrays $A_1$, $A_2$ and $A_3$ can be arranged radially so as to extend from the optical axis S as shown in FIG. 21.

The pupil divisional angle $\theta_F$ can be obtained from F-number $F_{NO}$ of the taking lens, using the following equation:

$$\theta_F = \sin^{-1} \frac{1}{2F_{NO}} \quad \text{Equation (3)}$$

The relationship between the pupil divisional angle $\theta_F$, the distance d from the focal surface G of the taking lens to a light receiving surface of each photosensor array and the pitch P between the photosensors of each photosensor array is represented by the following equation:

$$\theta_F = \tan^{-1} \frac{P}{2d} \quad \text{Equation (4)}$$

Figure 1:
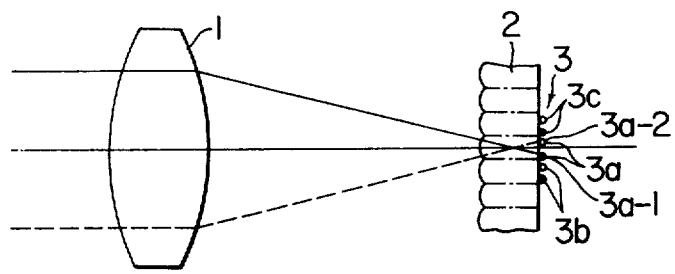
FIG. 1 schematically shows a focusing state of a pupil divisional type focusing position detection apparatus to which the invention can be applied.
Figure 2:
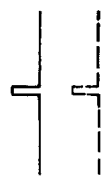
FIG. 2 shows the phases of the output signals of the photoelectric element arrays in the focusing state in FIG. 1.
Figure 3:
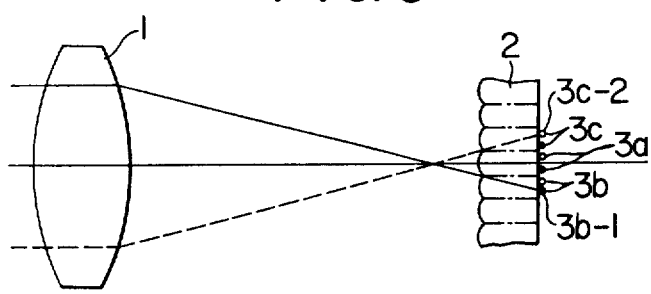
FIG. 3 schematically shows a front focusing state of the pupil divisional type focusing position detection apparatus of FIG. 1.
Figure 4:
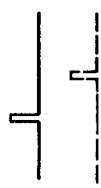
FIG. 4 shows the phases of the output signals of the photoelectric element arrays in the front focusing state in FIG. 3.
Figure 5:
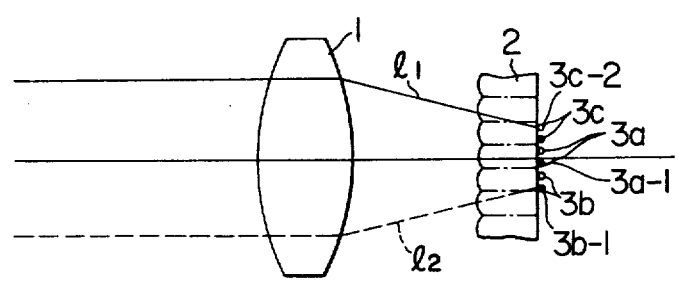
FIG. 5 schematically shows a back focusing state of the pupil divisional type focusing position detection apparatus of FIG. 1.
Figure 6:
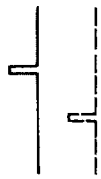
FIG. 6 shows the phases of the output signals of the photoelectric element arrays in the back focusing state in FIG. 5.
Figure 7:
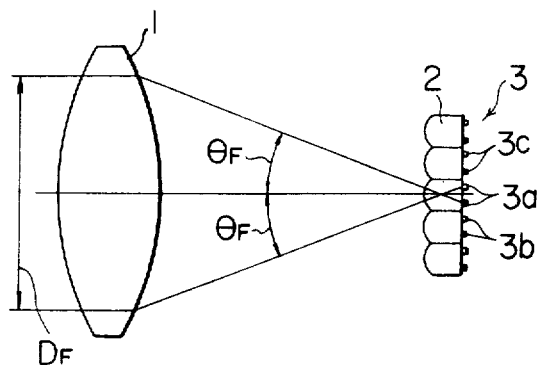
FIG. 7 shows a pupil divisional angle $\theta_F$ in the pupil divisional type focusing position detection apparatus of FIG. 1.
Figure 8:
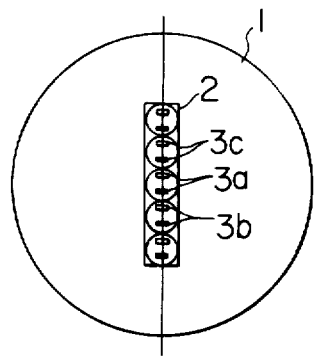
FIG. 8 shows a right side view of the pupil divisional type focusing position detection apparatus of FIG. 1.
Figure 22:
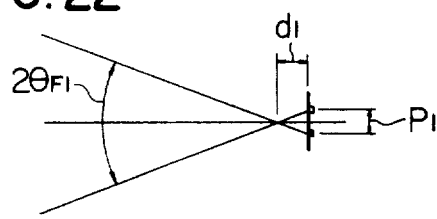
FIGS. 22, 23 and 24 show the changes of the distance d from the focal surface of a taking lens to a light receiving surface of a photosensor array and the change of the pitch P of the photosensor elements of the photosensor array depending upon the change of the pupil divisional angle $\theta_F$.
Figure 23:
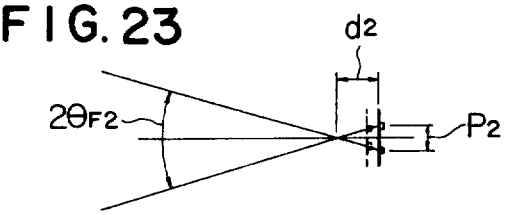
Figure 24:
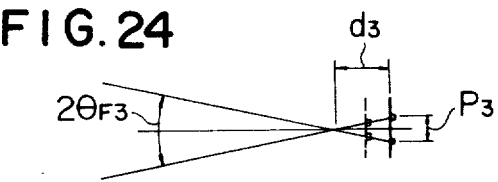

This relationship between d and P can be seen from FIGS. 22 to 24. The above equation indicates that by determining the distance d and the pitch P in accordance with each $\theta_F$, the respective divisional rays of light can be caused to enter the corresponding photoelements accurately. More specifically, with respect to the pitch P and the distance d, $d_1$ and $P_1$ are determined in accordance with a maximum pupil divisional angle $\theta_{F1}$ and then $d_2$ and $P_2$, $d_3$ and $P_3$ are determined respectively in accordance with $\theta_{F2}$ and $\theta_{F3}$.

When P is constant, as $\theta_F$ is decreased, d is increased. When d is great, the in-focus range is also great. Therefore, by selective use of a photosensor array out of the photosensor arrays which are disposed in accordance with each distance d corresponding to each pipil divisional angle, the focusing point can be detected, while the detection accuracy is taken into consideration.

The distance d can be changed by use of a zoom lens comprising a group of small lens elements disposed at the focal plane G of the taking lens. In this case, one fixed photosensor array is enough.

Furthermore, instead of increasing the distance d, the pitch P can be changed in accordance with the change of $\theta_F$, while the distance d is kept constant as shown in FIG. 21. In this case, photosensor arrays having different pitches P have to be used. However, since the distance d is constant, the small lens element group can be used changing its position and the construction of the focusing position detection apparatus becomes simpler than the apparatus of changing the distance d.

Furthermore, the pitch P and the distance d can be changed in combination.

Thus, by changing the distance d and/or the pitch P with respect to each photosensor array, the respective divisional rays of light having different pupil divisional angles $\theta_F$ can be caused to enter the corresponding photosensor arrays correctly.

When a taking lens having a diameter of pupil smaller than $D_{F1}$ and greater than $D_{F2}$ is used or an equivalent photographing condition is adopted with respect to the F-number, light does enter the first photosensor element array $A_1$ corresponding to the pupil dividional angle $\theta_{F1}$, the signal output from the first photosensor array $A_1$ is almost zero. In this case, the signal output from the second photosensor array $A_2$ is greater than the signal output from the third photosensor array $A_3$ since the pupil divisional angle $\theta_{F2}$ is greater than the pupil divisional angle $\theta_{F3}$ and the light quantity of the former is greater than that of the latter. Therefore, under this condition, the focusing position can be detected most accurately by use of the signal output from the second photosensor array $A_2$. This is because the greater the pupil divisional angle $\theta_F$, the higher the detection accuracy. Such a choice of the photosensor array can be made automatically in accordance with the diameter of pupil at open aperture of the taking lens or the signal of F-number, at each photographing, from an automatic exposure control apparatus. Alternatively, the array can be chosen manually based on a predetermined relationship between each array and the above-mentioned diameter of pupil or the signal of F-number.

Figure 25:
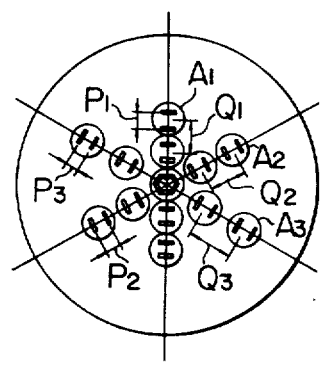
FIG. 25 shows schematically a still further embodiment of the invention.

As shown in FIG. 25, the accuracy of detecting the in-focus state can be varied by making the pitch P of the photosensor element in each photosensor array equal, while changing the pitch Q of the photosensor element arrays. The pitch Q is determined, depending upon the diffusion at each F-number. In this method, the standard for determining the focusing position detection accuracy is slackened by utilizing a property that the focusing position detection accuracy can be made lower as F-number is increased. In other words, the detection accuracy of a photosensor array having a large Q is lower than that of a photosensor array having a small Q. This difference comes from whether rays of light for measuring the distance, coming from the pupil exit, are closely measured or whether they are partially measured. Therefore, by disposing photosensor arrays having different pitches Q corresponding to specific F-numbers and using selectively a photosensor array in accordance with the F-number at the time of photographing, the focusing position detection accuracy can be caused to correspond to each F-number. This operation can be performed by substituting $Kx=1$ in the operation in FIG. 18.

This method is similar to a sampling inspection in the field of quality control. When high accuracy is required, total inspection has to be done. However, when high accuracy is not required, sampling inspection is sufficient. Therefore, in another method, a photosensor array in which photosensor elements are arranged as closely as possible is used instead of different photosensor arrays and, depending upon F-number at the time of photographing, every photosensor element, every second photosensor element or every third photosensor element can be used. This can be attained by performing a jumping operation of j←j+1 to j←j+Kx in the operations in FIGS. 15 and 18, wherein b−n=Nb×Kx (where Nb is an integer greater than zero) and a=-Na×Kx (where Na is an integer greater than zero). This is exactly the same as the sampling inspection in quality control and Kx corresponds to a sampling number and is determined corresponding to each F-number. This method is effective when the taking lens is moved in one direction, from a nearest point or vice versa.

In FIG. 25, Q can be changed by use of small lens elements having different diameters in the small lens groups corresponding to the respective photosensor arrays and, in accordance with the change, P can be changed as well.

Thus, as the number of the photosensor arrays having different d or P is increased, they can be caused to correspond more closely to the change of F-number so that the accuracy of detecting the focusing position can be increased. As mentioned previously, this can be also attained by use of a single photosensor array. In this case, d is changed since it is difficult to change P. More specifically, the photosensor array is designed so as to be movable in the direction of the optical axis of the taking lens and the photosensor array is moved in accordance with the change of F-number manually or automatically.

In cameras, the size of the diaphragm is set so as to be 1.4, 2, 2.8, 4, 5.6, 8, 11, 16 and 22. Therefore, when three photosensor arrays are employed, it can be designed that the first photosensor array covers 2 to 4, and the second photosensor array covers 4 to 8 and the third photosensor array covers 8 to 16. When four photosensor arrays are employed, they can be distributed in such a manner that the first photosensor array covers 1.4 to 2.8, the second photosensor array covers 2.8 to 5.6, the third photosensor array covers 5.6 to 11, and the fourth photosensor array covers 11 to 22.

What is claimed is:

1. In a focusing position detection apparatus in which rays of image formation light emitting from a peripheral portion of the exit pupil of a taking lens is divided into two rays of light and the divided two rays of light are caused to enter, through a small lens group disposed at the focal surface of said taking lens, a pair of self-scanning type photosensor arrays which are disposed normal to the optical axis of said taking lens, each photosensor array having a plurality of rows of photosensors, while the center of said pair of self-scanning type photosensor arrays is positioned corresponding to the optical axis of said taking lens, and the focusing position is detected by the phase difference of output signals produced from said photosensor arrays, the improvement of including one row of said pair of photosensor arrays disposed so as to correspond to said small lens group, a distance d being the distance from the light receiving surface of said photosensor arrays to the focal plane of said taking lens, and changing means to automatically change the distance d depending upon the F-number of said taking lens or the F-number determined at the photographing condition.

2. A focusing position detection apparatus as in claim 1, in which said photosensor arrays are disposed so that they do not overlap at the optical axis of said taking lens, and a suitable photosensor array for a selected F-number of said taking lens or of each photographing condition is selected.

3. A focusing position detection apparatus comprising an optical means for dividing rays of image formation light emitted from the exit pupil of a taking lens, photosensor means comprising at least one pair of photosensor elements for receiving said divided rays of image formation light and performing photoelectric conversion of said received rays of image formation light separately from each of said pair of photosensor elements and producing output signals corresponding to the photoelectrically converted rays of image formation light, focusing position detection means for detecting the phase difference of said output signals produced from said photosensor means and for detecting an in-focus position, and detecting accuracy changing means for automatically changing the accuracy of the in-focus position.

4. A focusing position detection apparatus as in claim 3, in which said detecting accuracy changing means comprises means for changing a permissible range of said phase difference of said output signals produced from said photosensor means.

5. A focusing position detection apparatus as in claim 3, in which said detecting accuracy changing means comprises means for changing a pupil divisional angle $\theta_F$ said exit pupil in which $$\theta_F = \frac{\sin^{-1}1}{2F_{No}}$$

where $F_{No}$ is the F-number of the taking lens.

6. A focusing position detection apparatus as in claim 3, in which said detecting accuracy changing means comprises means for changing a pitch P of said photosensor elements, in which the pitch P is the distance between each of the photosensor elements in the pairs of photosensor elements.

7. A focusing position detection apparatus as in claim 3, in which said detecting accuracy changing means comprises means for performing a statistical sampling of said output signals from said photosensor means.

8. A focusing position detection apparatus as in claim 3, in which said apparatus is utilized in a photographic apparatus having changeable F-numbers, and in which said detecting accuracy changing means comprises means for changing said accuracy in accordance with the F-number at the time of photography.

9. In a focusing position detection apparatus in which rays of image formation light emitting from a peripheral portion of a exit pupil of a taking lens is divided into two rays of light and the divided two rays of light are caused to enter, through a small lens group disposed at the focal surface of said taking lens, a pair of self-scanning type photosensor arrays which are disposed normal to the optical axis of said taking lens, each photosensor array having a plurality of rows of photosensors, with the center of said pair of self-scanning type photosensor arrays being positioned corresponding to the optical axis of said taking lens, and the focusing position being detected by a phase difference of output signals produced from said photosensor arrays, the improvement in which at least one row of said pair of photosensor arrays is disposed so as to correspond to said small lens group, a pitch P of photosensor elements of said photosensor arrays is the distance between the photosensor elements in each pair of photosensor elements of each array, and changing means to change pitch P depending upon the F-number of said taking lens or the F-number determined at the photographing condition.

10. A focusing position detection apparatus as in claim 9, in which said photosensor arrays are disposed so they do not overlap at the optical axis of said taking lens, and a suitable photosensor array for a selected F-number of said taking lens or of each photographing condition is selected.

* * * * *